United States Patent
Kachare et al.

(10) Patent No.: US 10,417,733 B2
(45) Date of Patent: Sep. 17, 2019

(54) SYSTEM AND METHOD FOR MACHINE LEARNING WITH NVME-OF ETHERNET SSD CHASSIS WITH EMBEDDED GPU IN SSD FORM FACTOR

(71) Applicant: Samsung Electronics Co., Ltd., Suwon-si, Gyeonggi-do (KR)

(72) Inventors: Ramdas P. Kachare, Cupertino, CA (US); Sompong Paul Olarig, Pleasanton, CA (US); David Schwaderer, Saratoga, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 15/672,223

(22) Filed: Aug. 8, 2017

(65) Prior Publication Data
US 2018/0342039 A1 Nov. 29, 2018

Related U.S. Application Data

(60) Provisional application No. 62/510,728, filed on May 24, 2017.

(51) Int. Cl.
*G06T 1/20* (2006.01)
*G06F 15/78* (2006.01)
*G06F 16/18* (2019.01)

(52) U.S. Cl.
CPC ............ *G06T 1/20* (2013.01); *G06F 15/7839* (2013.01); *G06F 15/7896* (2013.01); *G06F 16/1847* (2019.01)

(58) Field of Classification Search
None
See application file for complete search history.

(56) References Cited

U.S. PATENT DOCUMENTS

| | | | |
|---|---|---|---|
| 8,819,335 B1 | 8/2014 | Salessi et al. | |
| 8,935,463 B1 * | 1/2015 | Aswadhati | G06F 3/061 711/103 |
| 9,317,204 B2 | 4/2016 | Hahn et al. | |
| 9,430,412 B2 | 8/2016 | Huang | |
| 9,483,431 B2 | 11/2016 | Bergsten et al. | |
| 10,055,142 B1 * | 8/2018 | Bates | G06F 3/0613 |

(Continued)

OTHER PUBLICATIONS

Bae et al, "Intelligent SSD: A Turbo for Big Data Mining", CIKM'13, ACM, 2013. (Year: 2013).*

(Continued)

*Primary Examiner* — Kee M Tung
*Assistant Examiner* — Patrick F Valdez
(74) *Attorney, Agent, or Firm* — Lewis Roca Rothgerber Christie LLP

(57) ABSTRACT

In one aspect of the present disclosure, a data storage and processing system is provided. The system includes a host server and a storage unit. The storage unit includes a drive comprising a memory and a drive processor, an external switch configured to couple the host server to the drive to send and receive data between the host server and the memory of the drive and a graphics processing unit. The drive processor is configured to send processing instructions and data from the drive memory to the graphics processing unit and the graphics processing unit is configured to process the data according to the processing instructions to generate result data.

21 Claims, 6 Drawing Sheets

(56) References Cited

U.S. PATENT DOCUMENTS

| | | | |
|---|---|---|---|
| 2008/0320214 A1* | 12/2008 | Ma | G06F 3/0613 711/103 |
| 2013/0067133 A1* | 3/2013 | Mansell | G06F 11/3636 710/267 |
| 2013/0191555 A1* | 7/2013 | Liu | G06F 3/061 710/5 |
| 2014/0130188 A1* | 5/2014 | Baryudin | G06F 21/78 726/29 |
| 2015/0120874 A1* | 4/2015 | Kim | H04L 67/1097 709/218 |
| 2015/0378932 A1* | 12/2015 | Souri | G06F 8/00 711/209 |
| 2016/0210076 A1 | 7/2016 | Frank et al. | |
| 2016/0266848 A1* | 9/2016 | Lam | G06F 3/0688 |
| 2016/0350074 A1* | 12/2016 | Choi | G06F 9/30014 |
| 2017/0010995 A1 | 1/2017 | Robinson et al. | |
| 2017/0019312 A1 | 1/2017 | Meyer et al. | |
| 2017/0060442 A1 | 3/2017 | Dunn | |
| 2018/0260135 A1* | 9/2018 | Hayashida | G06F 3/0611 |

OTHER PUBLICATIONS

Cho et al, "XSD: Accelerating MapReduce by Harnessing the GPU inside an SSD", In Proceedings of the 1st Workshop on Near-Data Processing, 2013. (Year: 2013).*

M2 Presswire; "Excelero Launches from Stealth with NVMesh 1.1, a Server SAN that Unleashes Flash Performance in Web Scale Data Centres; 100% software-only solution delivers breakthrough in pooling NVMe across a network at local speeds and latencies on standard hardware, makes storage the engine of competitive advantage" Mar. 8, 2017, https://www.prnewswire.com/news-releases/excelero-launches-from-stealth-with-nvmesh-11-a-server-san-that-unleashes-flash-performance-in-web-scale-data-centers-300420015.html, 5 pages.

* cited by examiner

SYSTEM AND METHOD FOR MACHINE LEARNING WITH NVME-OF ETHERNET SSD CHASSIS WITH EMBEDDED GPU IN SSD FORM FACTOR

CROSS-REFERENCE TO RELATED APPLICATION(S)

The present application claims priority to and the benefit of U.S. Provisional Patent Application No. 62/510,728, filed on May 24, 2017, the contents of which are incorporated herein by reference in its entirety.

BACKGROUND

The amount of data being gathered and stored is increasing. Many applications, ranging from the Internet of Things, to social networks, to digital health areas, generate tremendous amounts of data. This data can be hosted in data systems such as data centers. The data often requires storing, processing, and analyzing. Algorithms such as machine learning algorithms may be applied to large data sets in order to extract features or useful information therefrom. Techniques and architectures for storing, processing, and analyzing this data quickly, efficiently, affordably, and resiliently are desired.

The above information disclosed in this Background section is only for enhancement of understanding of the background of the invention, and therefore it may contain information that does not form the prior art that is already known to a person of ordinary skill in the art.

SUMMARY

In one aspect of the present disclosure, a data storage and processing system is provided. The system includes a host server and a storage unit. The storage unit includes a drive comprising a memory and a drive processor, an external switch configured to couple the host server to the drive to send and receive data between the host server and the memory of the drive and a graphics processing unit. The drive processor is configured to send processing instructions and data from the drive memory to the graphics processing unit and the graphics processing unit is configured to process the data according to the processing instructions to generate result data.

In one embodiment, the graphics processing unit comprises a U.2 connector, the graphics processing unit is connected to the drive through the U.2 connector, and the graphics processing unit receives the processing instructions and data through the U.2 connector.

In one embodiment, the graphics processing unit is configured to send the result data to the drive processor and the drive processor is configured to store the result data in the drive memory.

In one embodiment, the graphics processing unit is coupled to the external switch, and wherein the graphics processing unit is configured to send the result data to the host server utilizing the external switch.

In one embodiment, the graphics processing unit is configured to send a status message to the drive processor upon completing the processing of the data according to the processing instructions.

In one embodiment, the host server is configured to send a trigger instruction to the drive processor, the drive processor is configured to execute a data processing algorithm in response to the trigger instruction, and the data processing algorithm comprises steps which when executed cause the drive processor to send the data and the processing instructions to the graphics processing unit.

In one embodiment, the drive comprises a capability table, and the drive processor is configured to identify a data chunk stored on the drive memory and a transform to be applied to the data chunk, retrieve an address of the graphics processing unit from the capability table, wherein the capability table indicates that the graphics processing unit can perform the transform, and send the data chunk to the address of the graphics processing unit.

In one embodiment, the storage unit further comprises a baseboard management controller configured to determine capabilities of the graphics processing unit and to update the capability table based on the capabilities of the graphics processing unit.

In one embodiment, the storage unit comprises a plurality of said drive, each drive having a separate capability table, the storage unit comprises a plurality of said graphics processing unit, and the baseboard management controller is configured to update each capability table of each drive of the plurality of drives.

In one embodiment, the baseboard management controller and the graphics processing unit are configured to communicate using the Non Volatile Memory Express-Management Interface protocol, and wherein the baseboard management controller determines the capabilities of the graphics processing unit by utilizing the Non Volatile Memory Express-Management Interface Identify command.

In one embodiment, the storage unit comprises a plurality of said graphics processing unit, and wherein the baseboard management controller is configured to determine a load for each graphics processing unit of the plurality of graphics processing units and update the capability table based on the load for each graphics processing unit of the plurality of graphics processing units.

In one embodiment, the external switch is an Ethernet switch and the drives are Ethernet solid state drives.

In one embodiment, the host server communicates with the storage unit using a remote direct access storage protocol.

In one embodiment, the storage unit further comprises a chassis and a baseboard management controller, the graphics processing unit is a field replaceable unit, and the baseboard management controller is configured to detect a plug-in event corresponding to the graphics processing unit being inserted into the chassis.

In another aspect of the present disclosure, a method of operating a data storage and processing system is provided. The system includes a drive and a graphics processing unit. The drive includes a drive processor and a drive memory. The method includes receiving, by the drive processor, data from a host server, storing, by the drive processor, the data on the drive memory, detecting, by the drive processor, a trigger, executing, by the drive processor, an algorithm in response to the trigger, the algorithm identifying a data chunk of the data stored on the drive memory and a transform to apply to the data chunk, searching, by the drive processor, a capability table for an address corresponding to a device for performing the transform, and sending, by the drive processor, the data chunk and processing instructions for processing the data chunk to the address, the address being the address of the graphics processing unit.

In one embodiment, the method includes receiving, by the graphics processing unit, the data chunk and the processing instructions, and processing, by the graphics processing unit, the data chunk according to the processing instructions to generate result data.

In one embodiment, the method includes sending, by the graphics processing unit, the result data to the drive processor, and storing, by the drive processor, the result data on the drive memory.

In one embodiment, the method includes detecting, by a baseboard management controller, a capability of the graphics processing unit, and updating, by the baseboard management controller, the capability table based on the capability of the graphics processing unit.

In one embodiment, the data storage and processing system comprises a plurality of said drive, each drive of the plurality of drives comprises a capability table, and wherein the method comprises updating, by the baseboard management controller, each capability table of each drive of the plurality of drives based on the capability of the graphics processing unit.

In another aspect of the present disclosure, a data storage and processing system is provide. The system includes a drive and a graphics processing unit. The drive includes a drive processor and a drive memory. The system also includes means for receiving data from a host server, means for storing the data on the drive memory, means for detecting a trigger, means for executing an algorithm in response to the trigger, the algorithm identifying a data chunk of the data stored on the drive memory and a transform to apply to the data chunk, means for searching a capability table for an address corresponding to a device for performing the transform, means for sending the data chunk and processing instructions for processing the data chunk to the address, the address being the address of the graphics processing unit, means for processing the data chunk according to the processing instructions to generate result data and send the result data to the host server, and means for detecting a plug-in event of a field replaceable graphics processing unit, determining a capability of the field replaceable graphics processing unit, and updating the capability table in response to detecting the plug-in event based on the capability of the field replaceable graphics processing unit.

DETAILED DESCRIPTION

Figure 1:
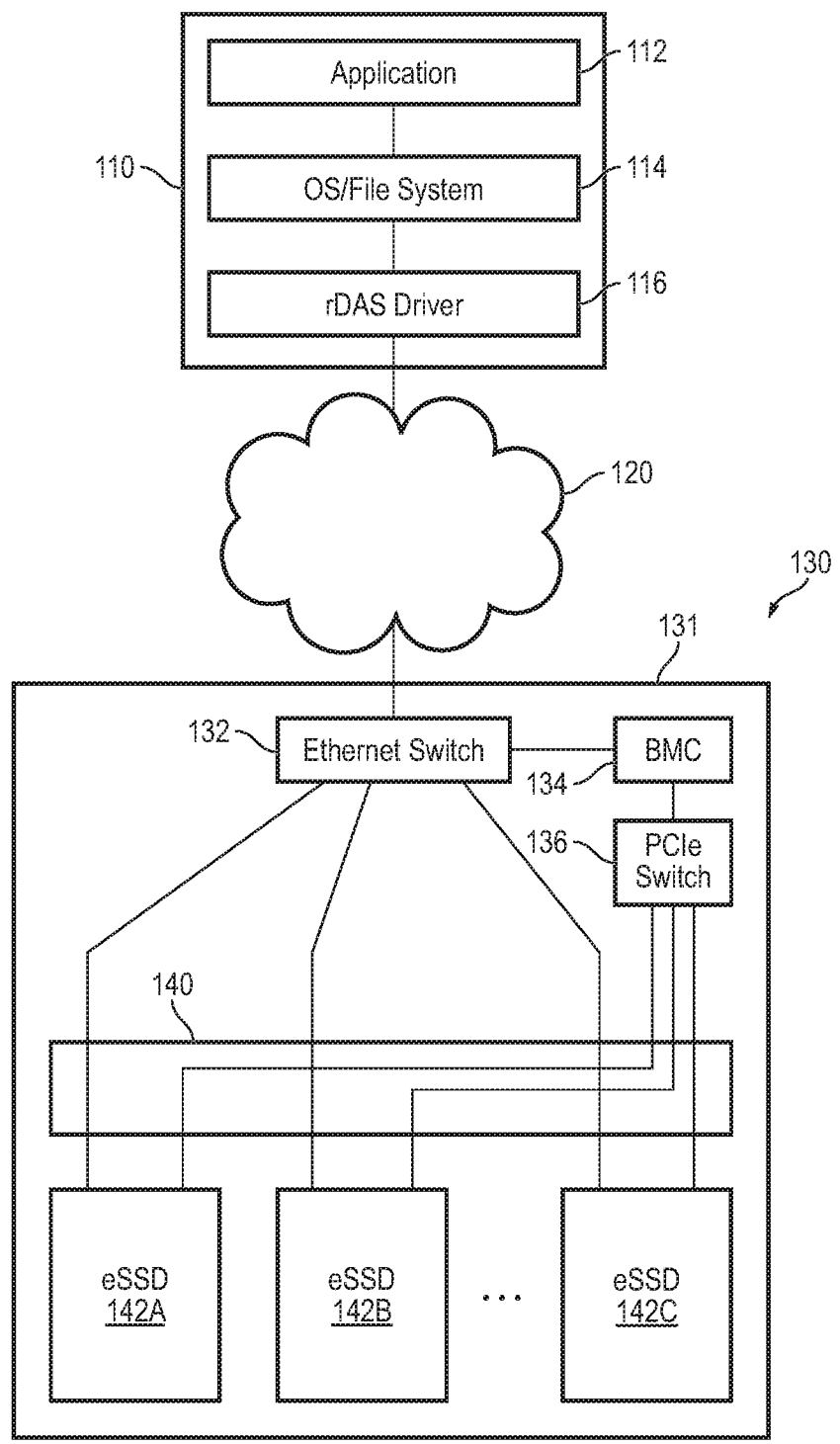
FIG. 1 is a block diagram of a storage system according to a related art.

In the following detailed description, only certain exemplary embodiments of the present invention are shown and described, by way of illustration. As those skilled in the art would recognize, the invention may be embodied in many different forms and should not be construed as being limited to the embodiments set forth herein. Descriptions of features or aspects within each exemplary embodiment should typically be considered as available for other similar features or aspects in other exemplary embodiments. Like reference numerals designate like elements throughout the specification.

FIG. 1 is a block diagram of a storage system according to a related art. A host server 110 is connected to one or more storage units 130 through network 120. The host server 110 runs one or more applications 112 and an operating system and file system 114. The host server 110 also includes a remote direct access storage (rDAS) driver 116 utilized to interact with the one or more storage unit 130.

The storage unit 130 includes a chassis 131, an Ethernet switch 132, a baseboard management controller (BMC) 134, a PCIe switch 136, and a plurality of Ethernet solid state drives (eSSD) 142A-C. The PCIe switch 136 connects the BMC 134 to the eSSDs 142A-C through the chassis midplane 140. The BMC 134 utilizes the PCIe switch 136 to manage the eSSDs 142A-C. The Ethernet switch 132 connects the eSSDs 142A-C to the network 120. The host server 110 utilizes the rDAS driver 116 to send data to, and receive data from, the eSSDs 142A-C through the Ethernet switch 132.

Processes such as machine learning may require that large quantities of data be processed. Computation resources (e.g. processors) execute algorithms (e.g. machine learning algorithms) on data. In performing such processing on data stored on the storage unit 130, the host server 110 has to request the data to be processed from the storage unit 130. The storage unit 130 must send the data to the host server 110 over the network 120. The host server 110 then processes the data utilizing a CPU or GPU located at the host server 110, for example by executing machine learning algorithms, and may need to send the results of the processing back to the storage unit 130 for storage.

Moving the data from the storage unit 130 to the host server 110 for processing can consume substantial electrical energy and can involve processing delays associated with propagating the data and results back and forth through the network 120. The architecture can also be expensive, as it requires adequate bandwidth to transmit the data and the results through the network 120 and processing resources and system memory at the host server 110 to handle processing of the data. Further, the speed of the processing resources in handling the data at the host server 110 can bottleneck processing of data sets, and the processing resources used to handle the processing may not be easy to add, remove, or replace.

Figure 2:
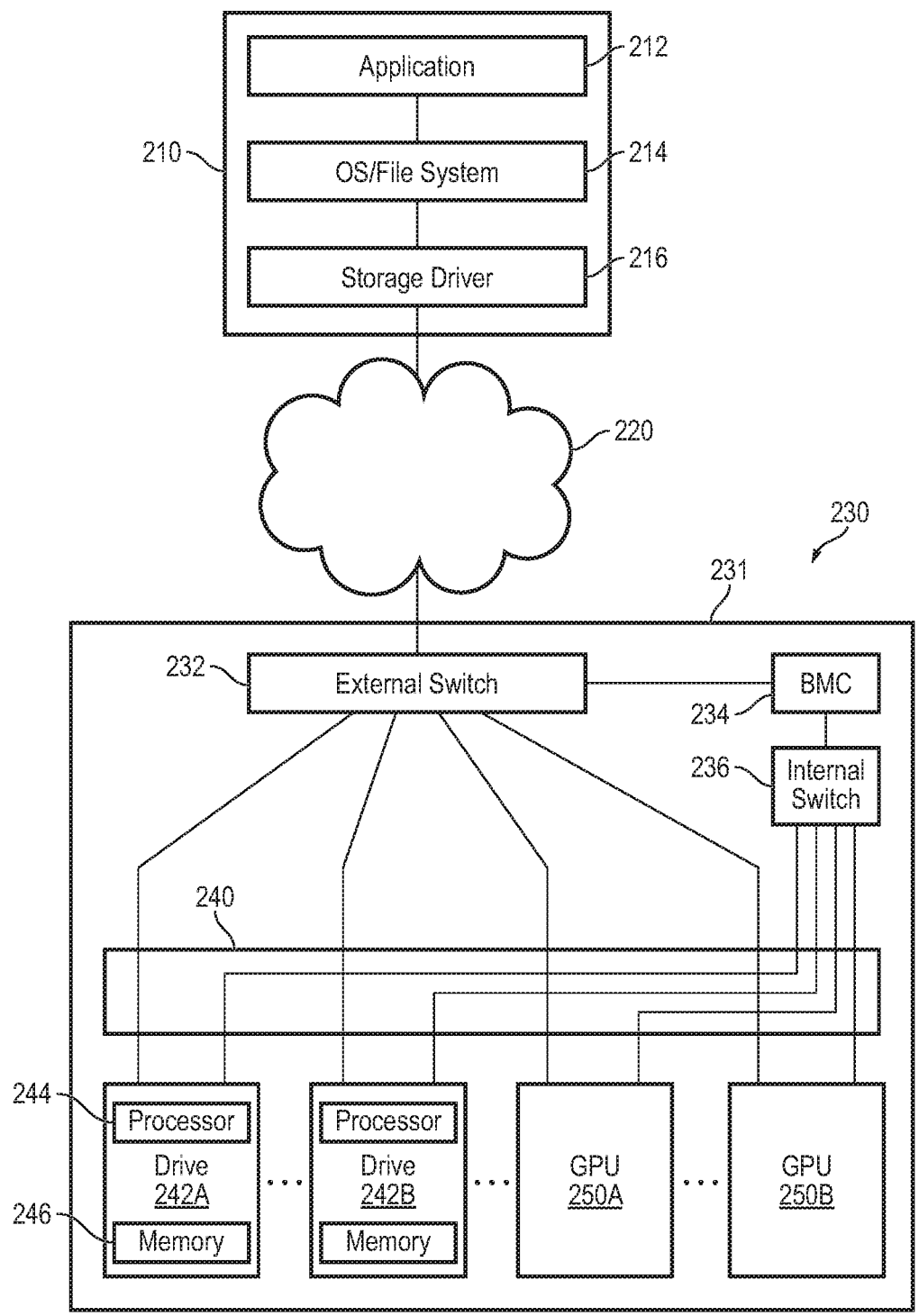
FIG. 2 is a block diagram of a storage system according to embodiments of the present disclosure.

FIG. 2 is a block diagram of a storage system according to embodiments of the present disclosure. Referring to FIG. 2, a host server 210 is connected to one or more storage unit 230 through network 220. The host server 210 may run applications 212 and an operating system and file system 214. The host server 210 may also include a storage driver 216 utilized to interact with the one or more storage unit 230.

The storage unit 230 may include a chassis 231, an external switch 232 (e.g., an ethernet switch), a baseboard management controller (BMC) 234, an internal switch 236 (e.g., a PCIe switch), one or more drives 242A-B, and one or more U.2 graphics processing units (U.2 GPU) 250A-B. Note, although the term U.2 GPU will be used throughout the specification, the GPU can operate with a connection other than the U.2 connection, and those connections are within the scope of the present disclosure; the term is simply used for clarity. The internal switch 236 connects the BMC 234, the drives 242A-B, and the U.2 GPUs 250A-B through the chassis midplane 240. The external switch 232 connects to the drives 242A-B, the U.2 GPUs 250A-B, the BMC 234, and the network 220. The chassis 231 includes a plurality of slots for receiving drives and/or U.2 GPUs according to embodiments of the present disclosure.

For example, in some embodiments, the storage driver 216 is a remote direct access storage (rDAS) driver such as an NVMe-over-fabrics (NVMe-oF) driver, the network 220 is an Ethernet network, the external switch 232 is an Ethernet switch, and the drives are Ethernet solid state drives (eSSD). The host server 210 utilizes the rDAS driver to communicate data to and from the eSSDs in one or more storage unit 230 over the Ethernet network. In some embodiments, the internal switch 236 is a PCIe switch.

Figure 3:
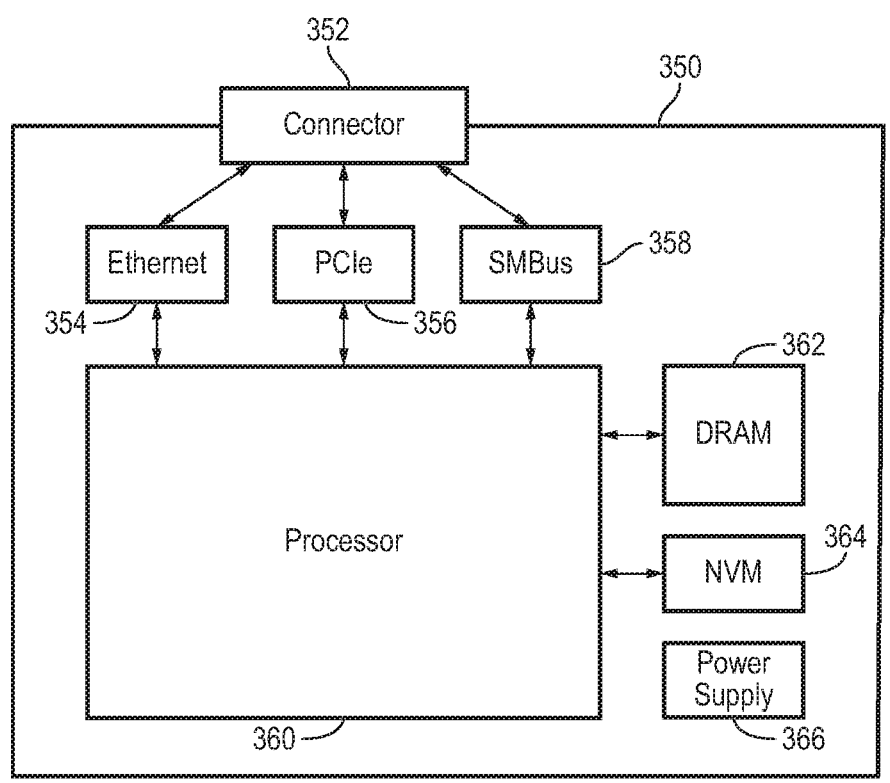
FIG. 3 is a block diagram of a graphics processing unit according to embodiments of the present disclosure.

FIG. 3 is a block diagram of a U.2 GPU 350 according to embodiments of the present disclosure. In some embodiments, the U.2 GPUs 250A-B of FIG. 2 are implemented as the U.2 GPU 350 of FIG. 3. Referring to FIG. 3, the U.2 GPU 350 includes a processor 360, DRAM 362, non-volatile memory 364, a power supply/power regulator 366, and a connector 352. In some embodiments, the U.2 GPU 350 may also include a power supply/power regulator 366. The connector 352 provides an interface to connect to the processor 360. The connector 352 may provide interfaces for interfacing with an internal switch such as a PCIe switch and an external switch such as an Ethernet switch. For example, the connector may provide an Ethernet interface 354, a PCIe interface 356, and a system management bus (SMBus) interface 358. In one embodiment, the connector 352 is a U.2 connector/SFF-8639 connector.

The U.2 GPU 350 may be configured to be plugged into a chassis of a storage unit alongside drives (e.g. eSSDs) and to communicate with the BMC of the storage unit. In some embodiments, the connector 352 is configured to be connected to the same slots on the chassis as drives such as eSSDs. In some embodiments, the U.2 GPU 350 can also communicate with an external switch such as an Ethernet switch when plugged into the chassis. In some embodiments, the U.2 GPU 350 may accordingly be implemented as a field replaceable unit which can be inserted into and/or removed from a chassis and automatically be accommodated into or removed from the operation of the storage unit. An example is discussed with respect to FIG. 6, below. In this way, processing resources in the form of U.2 GPUs 350 can be added to, removed from, or replaced in storage units efficiently. The U.2 GPUs are also provided with the full power available to a given slot (the full power that the connector supports) and can utilize that wattage for processing operations, whereas a drive placed in the slot would utilize the same wattage for storage operations. For example, in an embodiment, the connector is a U.2 connector and the U.2 GPUs are provided with 25 Watts of power.

Referring again to FIG. 2, the drives 242A-B may include a processor 244 and memory 246, such as flash memory or other non-volatile memory. In some embodiments, the drives 242A-B may also include dynamic random access memory (DRAM) to be utilized by the processor 244. In one or more of the drives 242A-B, the processor 244 may execute instructions implementing data processing algorithms such as machine learning algorithms on data stored on the memory 246 of the corresponding drive. As part of executing these instructions, the processor 244 may send data from the memory 246, as well as instructions for processing the data, to a U.2 GPU 250. In some embodiments, the data and instructions are sent between a drive 242 and a U.2 GPU 250 through the midplane 240 via the internal switch 236. In some embodiments, the data and instructions are sent between a drive 242 and a U.2 GPU 250 through the external switch 232. The drives 242A-B and the U.2 GPUs 250A-B may both utilize a connector such as a U.2 connector.

Figure 4:
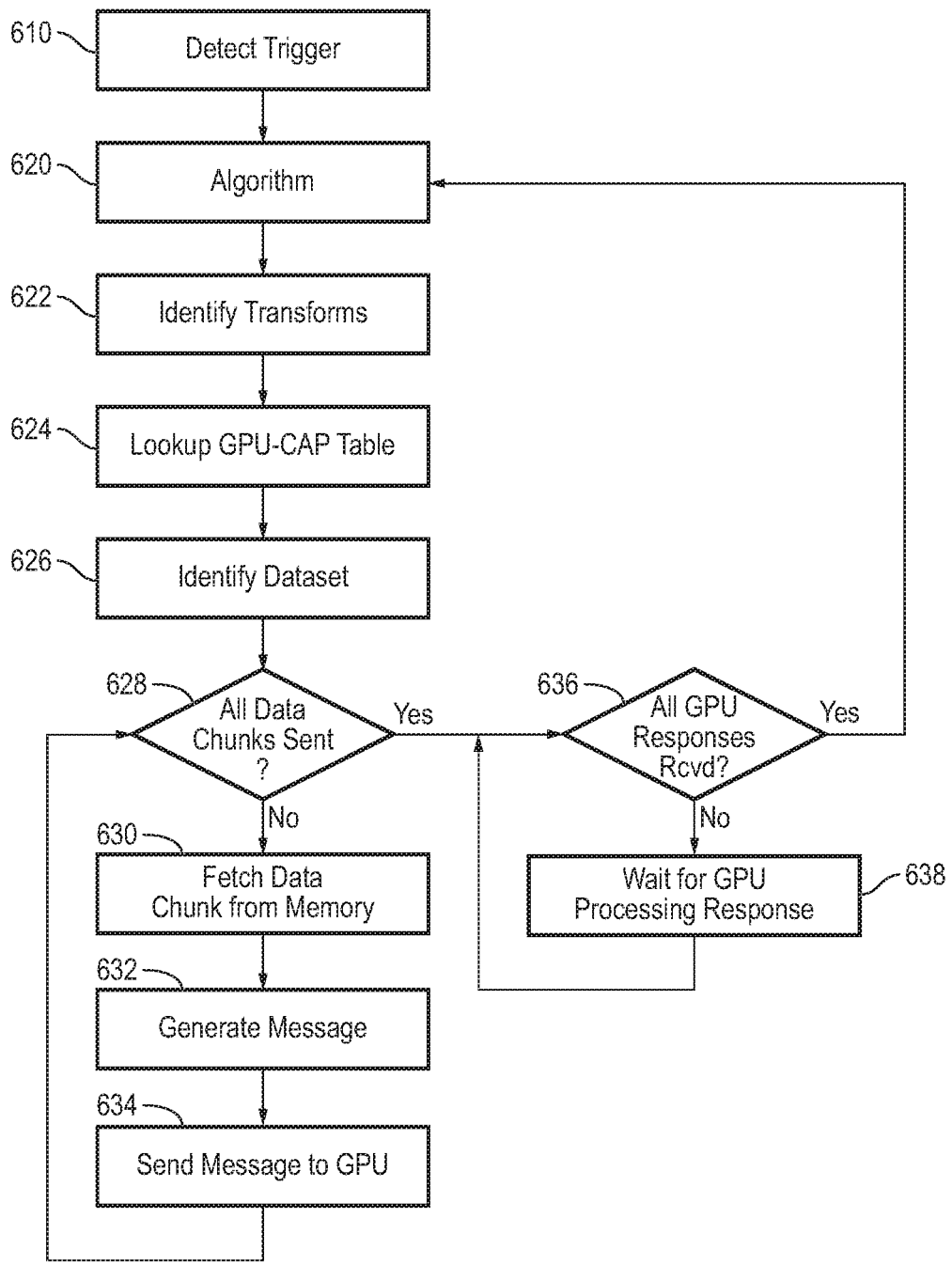
FIG. 4 is a block diagram showing a procedure for a drive to communicate with a graphics processing unit according to embodiments of the present disclosure.

FIG. 4 is a block diagram showing a procedure for a drive 242 (e.g., a drive 242 of FIG. 2) to communicate with a U.2 GPU 250 according to embodiments of the present disclosure. The procedure of FIG. 4 may be executed by a processor 244 embedded in the drive 242. At act 610, the processor 244 may detect a trigger. The trigger may indicate that the processor 244 should process data contained on a memory 246 of the drive 242 according to algorithms such as machine learning algorithms. For example, in some embodiments, a trigger may be the passage of a certain amount of time, i.e. the algorithm is triggered to automatically run periodically in the background. In some embodiments, the trigger may be instructions or a query received from the host server 210 or another external source. In some embodiments, the trigger may be a new block of data being received by the drive 242, or another data operation (e.g. read, write, delete, or update) received from the host 210. In some embodiments, the trigger may be the result of a machine learning algorithm that requires additional analysis, processing, or other type processing. In some embodiments, the trigger may be generated in response to some internal state or operation of the drive, such as the amount of data stored exceeding a threshold. In some embodiments, the trigger may be received from another drive 242, and in some embodiments, the drive 242 may forward a trigger to other drives 242.

In some embodiments, the algorithm is stored on the drive 242 in the memory 246 or elsewhere (e.g. a separate DRAM), and the trigger simply indicates that the stored algorithm should be executed. In some embodiments, the trigger may include the algorithm to be run. In some embodiments, the drive 242 may have a plurality of algorithms stored, and the trigger may include a tag identifying which algorithm to run. At act 620, the processor 244 begins to execute the algorithm. In some embodiments, the algorithm 620 is a machine learning algorithm. At act 622, the processor 242 identifies that one or more transform, function, or other form of processing should be performed on one or more data chunks of the data on the memory 246, for example based on instructions in the algorithm or current processor 244 utilization.

Figure 5:
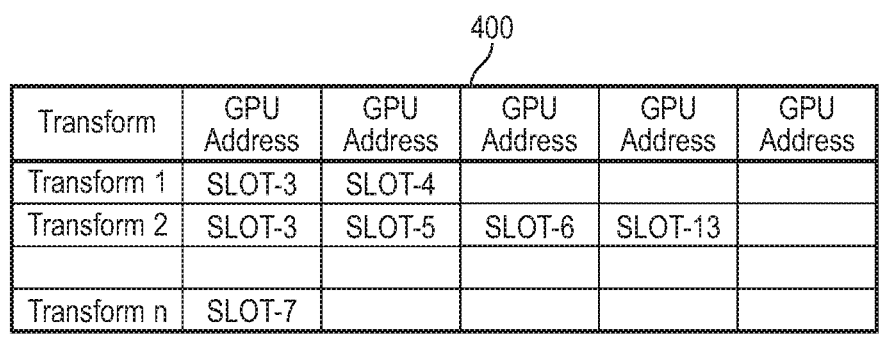
FIG. 5 shows a capability table according to embodiments of the present disclosure.

At act 624, the processor 242 examines a capability table (CAP table) to identify the address of a U.2 GPU 250 which can perform the required transform, function, or other processing task. In some embodiments, the CAP table is stored on the drive 242. FIG. 5 shows an example of a CAP table 500 according to embodiments of the present disclosure. The CAP table 500 includes entries for a series of transforms 1 to n corresponding to transforms, functions, or other processing tasks the processor 242 may utilize a U.2 GPU 250 to perform. Each entry is populated with an address of a U.2 GPU which the processor 242 may utilize to perform the given transform. For example, a processor for a drive storing the CAP table 500 may utilize the U.2 GPU in SLOT-3 or the U.2 GPU in SLOT-4 to perform transform 1. The processor 242 selects U.2 GPUs identified in the CAP table for performing the transforms identified by the algorithm.

At act 630, the processor 244 retrieves a data chunk to be processed by a U.2 GPU 250. The data chunk may be fetched from the memory 246 and/or may be fetched from the read/write cache buffers of the drive 242. At act 632, the processor 244 may generate a message including the data chunk and the instructions for processing the data chunk, for example by placing the instructions in the header of the message and the data chunk in the body. At act 634, the processor 244 communicates the message to the U.2 GPU 250, for example by communicating through the internal switch 236 utilizing the PCIe protocol.

At act 628, the processor 244 determines if all of the data chunks to be processed by a U.2 GPU 250 have been sent to a U.2 GPU. If not, the processor 244 repeats acts 630, 632, and 634 for the remaining data chunk. If the processor 244 determines that all of the data chunks intended to be processed have been sent to U.2 GPUs 250, the procedure proceeds to act 636.

Upon receiving a message from the processor 244 of a drive 242, a U.2 GPU 250 may perform the transform identified in the message on the data chunk received in the message to generate result data. Once the U.2 GPU 250 has generated the result data, it may send a processing response message to the processor 244 indicating that the transform has been completed. In some embodiments, the processing response message may include the result data and the processor 244 may store the result data in the memory 246 of the drive 242. In some embodiments, the U.2 GPU 250 may additionally or alternatively send the result data to another location within the storage unit 130 containing the U.2 GPU 250 or outside the storage unit 130. For example, the U.2 GPU 250 may additionally or alternatively send the result data to the host server 210, or the processor 244 may include an address in the message to the U.2 GPU 250 and the U.2 GPU 250 may forward the result data to the specified address.

At act 636, the processor 244 determines whether it has received a processing response message from each U.2 GPU 250 which received a message sent at act 634. If not, the processor 244 waits to receive any remaining processing response messages. If all processing response messages have been received, the procedure may return to act 620 and the processor 244 may continue executing the algorithm. Alternatively, for example if the algorithm has been completed, the procedure may return to act 610 and the processor 244 may wait to detect another trigger to proceed.

Figure 6:
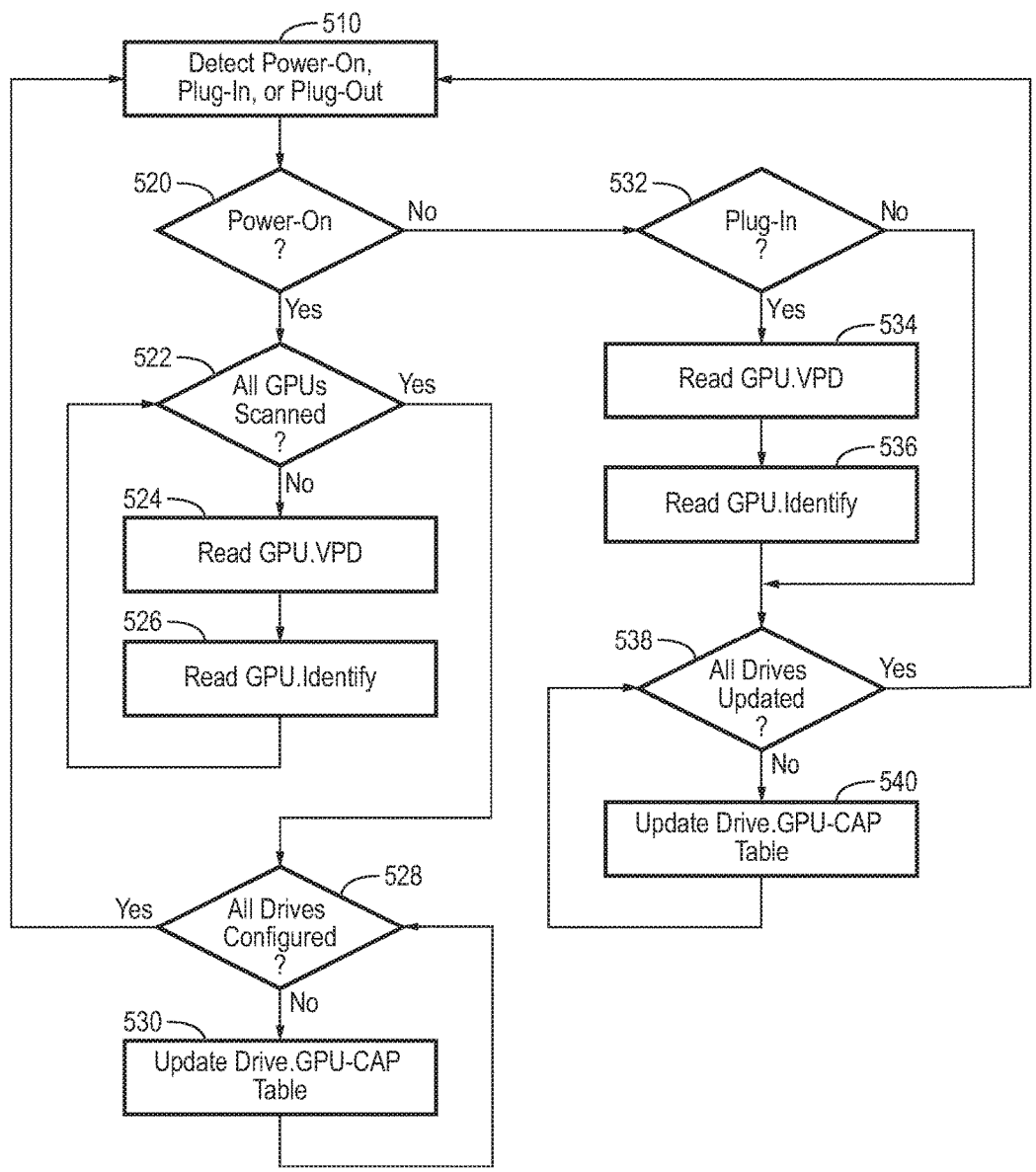
FIG. 6 is a block diagram showing a procedure for a baseboard management controller to manage graphics processing units according to embodiments of the present disclosure.

FIG. 6 is a block diagram showing a procedure for a baseboard management controller (BMC) 234 to manage U.2 GPUs 250A-B according to embodiments of the present disclosure. At act 510, the BMC 234 detects that there has been a power-on, a plug-in, or a plug-out event. For example, the BMC 234 may monitor "present" pins on a port (midplane slot) of a chassis 231, and may detect that a plug-in event has occurred when a new U.2 GPU 250 is coupled to the present pin (inserted in the midplane slot) or may detect that a plug-out event has occurred when a U.2 GPU 250 is removed from a present pin (midplane slot). In one embodiment, the BMC 234 utilizes the PCIe or SMBus interface to communicate with the U.2 GPU 250 using the NVMe Management Interface (NVMe-MI) protocol.

At act 520, if the BMC 234 determines that the event was a power-on event, the BMC 234 determines the capabilities of any U.2 GPU 250 coupled to the BMC 234. For example, as shown in FIG. 6, at act 524, the BMC 234 may read the vital product data (VPD) GPU.VPD for a U.2 GPU 250 coupled to the BMC 234. At act 526, the BMC 234 may additionally or alternatively utilize the NVMe "Identify" command to gather information related to the capabilities of the U.2 GPU 250. At act 522, if the BMC 234 determines that there are one or more U.2 GPUs 250 coupled to the BMC 234 which have not been scanned to determine their capabilities, the BMC 234 repeats steps 524 and/or 526 for the remaining U.2 GPU or U.2 GPUs. If the BMC 234 determines that each U.2 GPU 250 coupled to the BMC 234 has been scanned to determine its capabilities, the procedure proceeds to act 530.

At act 530, the BMC 234 updates the CAP table at a drive 242 based on the determined capabilities of the U.2 GPUs. In some embodiments, the determined capabilities may include one or more of current utilization of the U.2 GPU, U.2 GPU features, U.2 GPU generation, U.2 GPU processing capability, number of thread processors, size of U.2 GPU DRAM, bandwidth, latency, precision, input output sizes, and operating MHZ speed. For example, if the BMC 234 determined that a U.2 GPU 250 at SLOT 3 was capable of performing transform 1 or transform 2 for the drive 242, the CAP table for the drive 242 would be updated to include the SLOT 3 address as corresponding to transform 1 and transform 2. At act 528, if the BMC 234 determines that one or more drives 242 coupled to the BMC 234 have not had their CAP tables updated, the BMC 234 returns to act 530 and updates the next drive 242. If the BMC determines that each drive 242 coupled to the BMC 234 has had its CAP table updated, then the procedure returns to act 510 and the BMC 234 resumes waiting to detect another power-on, plug-in, or plug-out event.

If the BMC 234 determines that the event detected at act 510 was not a power-on event, the procedure advances to act 532. At act 532, if the BMC 234 determines that the event was a plug-in event, the BMC 234 determines the capabilities of the U.2 GPU 250 which was coupled to the BMC 234, causing the plug-in event. This plug-in event may correspond to a case where the U.2 GPU is implemented as a field-replaceable unit, and the field replaceable U.2 GPU is connected to a chassis 231 which already contains one or more drives 242. As an example of determining the capabilities of the U.2 GPU 250, as shown in FIG. 6, at act 534, the BMC 234 may read the VPD GPU.VPD for the U.2 GPU 250. At act 526, the BMC 234 may additionally or alternatively utilize the NVMe "Identify" command to gather information related to the capabilities of the U.2 GPU 250. Once the capabilities of the U.2 GPU 250 which caused the plug-in event have been determined, the procedure advances to acts 540 and 538, at which the BMC 234 updates the CAP tables of drives 242 coupled to the BMC 234 based on the capabilities of the new U.2 GPU 250 as described above with respect to acts 530 and 528.

If the BMC determines that the event was not a plug-in event, e.g. if the BMC 234 determines that the event was a plug-out event, the procedure advances to act 540. This plug-out event may correspond to a case where the U.2 GPU is implemented as a field-replaceable unit and the U.2 GPU is removed from the chassis 231. At acts 540 and 538, the BMC 234 updates the CAP tables of the drives 242 based on the plug-out event corresponding to the U.2 GPU 250. For example, the BMC 234 may remove the former address of the U.2 GPU 250 from the CAP tables.

In some embodiments, in addition to power-on, plug-in, and plug-out events, the BMC may determine that an event was a storage admin event. This may indicate that a storage administrator (e.g. an application 212 on the host 210) has changed which U.2 GPU 250 may be available to which drive 242. If the event was a storage admin event, the BMC 234 may update the CAP tables accordingly. For example, a storage admin event may indicate that a particular U.2 GPU 250 is not available to assist a specific drive 242, and the BMC 234 may remove the particular U.2 GPU 250 from the CAP table of the specific drive 242.

In some embodiments, when the BMC 234 updates the CAP tables of the drives 242, the BMC 234 considers considerations other than the capabilities of each U.2 GPU in determining which U.2 GPU to list as available to which drive and for which transform. For example, in one embodiment, the BMC 234 balances the load on the U.2 GPUs 250 by assigning certain drives 242 to certain U.2 GPUs 250, either on a transform-by-transform basis or for any transform required by the drive 242. In such an embodiment, the BMC 234 may only update the CAP table of a given drive 242 to include the address of its assigned U.2 GPU 250. In another embodiment, the BMC 234 may allocate particular U.2 GPUs 250 to handle particular transforms based on the capabilities of the particular U.2 GPUs 250. In such an embodiment, the BMC 234 may update the CAP tables to include the address of the allocated U.2 GPU or U.2 GPUs for the particular transform, but may not include the address for other transforms even if the U.2 GPU capabilities are sufficient to handle the other transforms. For example, the BMC 234 may reserve the most powerful U.2 GPU, which is located at SLOT 2, for transform 3. The U.2 GPU at SLOT 2 may have capabilities adequate to handle transforms 1-9. The BMC 234 may update the CAP tables to include SLOT 2 as corresponding to transform 3, but may not include SLOT 2 for any of the other transforms, thereby preventing the drives 242 from utilizing the U.2 GPU at SLOT 2 for any transform other than transform 3. In some embodiments, the BMC 234 can perform load balancing based on the type of algorithm involved in the transform compared to available U.2 GPU features; currently available U.2 GPU features (e.g. not dedicated or fully allocated); and/or the number of concurrent algorithms that can simultaneously run.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the use of "may" when describing embodiments of the inventive concept refers to "one or more embodiments of the inventive concept." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the inventive concept described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the inventive concept.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A data storage and processing system comprising:
   a host server; and
   a storage unit, the storage unit comprising:
      a drive comprising a drive memory and a drive processor;
      an external switch configured to couple the host server to the drive to send and receive data between the host server and the drive memory of the drive; and
      a graphics processing unit, wherein the drive processor is configured to send processing instructions and data from the drive memory to the graphics processing unit and the graphics processing unit is configured to process the data according to the processing instructions to generate result data,
   wherein the drive comprises a table, and the drive processor is configured to:
      identify a data chunk stored on the drive memory and a transform to be applied to the data chunk, wherein the table indicates that the graphics processing unit is capable of performing the transform; and
      send the data chunk to the graphics processing unit.

2. The system of claim 1, wherein the graphics processing unit comprises a U.2 connector, the graphics processing unit is connected to the drive through the U.2 connector, and the graphics processing unit receives the processing instructions and data through the U.2 connector.

3. The system of claim 1, wherein the graphics processing unit is configured to send the result data to the drive processor and the drive processor is configured to store the result data in the drive memory.

4. The system of claim 1, wherein the graphics processing unit is coupled to the external switch, and wherein the graphics processing unit is configured to send the result data to the host server utilizing the external switch.

5. The system of claim 4, wherein the graphics processing unit is configured to send a status message to the drive processor upon completing the processing of the data according to the processing instructions.

6. The system of claim 1, wherein the drive processor is configured to:
retrieve an address of the graphics processing unit from the table; and
send the data chunk to the address of the graphics processing unit.

7. The system of claim 1, wherein the storage unit further comprises a baseboard management controller configured to determine capabilities of the graphics processing unit and to update the table based on the capabilities of the graphics processing unit.

8. The system of claim 7, wherein:
the storage unit comprises a plurality of said drive, each drive having a separate table;
the storage unit comprises a plurality of said graphics processing unit; and
the baseboard management controller is configured to update each table of each drive of the plurality of drives.

9. The system of claim 7, wherein the baseboard management controller and the graphics processing unit are configured to communicate using a Non Volatile Memory Express-Management Interface protocol, and wherein the baseboard management controller determines the capabilities of the graphics processing unit by utilizing a Non Volatile Memory Express-Management Interface Identify command.

10. The system of claim 7, wherein the storage unit comprises a plurality of said graphics processing unit, and wherein the baseboard management controller is configured to determine a load for each graphics processing unit of the plurality of graphics processing units and update the table based on the load for each graphics processing unit of the plurality of graphics processing units.

11. The system of claim 1, wherein the external switch is an Ethernet switch and the drives are Ethernet solid state drives.

12. The system of claim 1, wherein the host server communicates with the storage unit using a remote direct access storage protocol.

13. The system of claim 1, wherein the storage unit further comprises a chassis and a baseboard management controller, the graphics processing unit is a field replaceable unit, and the baseboard management controller is configured to detect a plug-in event corresponding to the graphics processing unit being inserted into the chassis.

14. A data storage and processing system comprising:
a host server; and
a storage unit, the storage unit comprising:
a drive comprising a drive memory and a drive processor;
an external switch configured to couple the host server to the drive to send and receive data between the host server and the drive memory of the drive; and
a graphics processing unit, wherein the drive processor is configured to send processing instructions and data from the drive memory to the graphics processing unit and the graphics processing unit is configured to process the data according to the processing instructions to generate result data,
wherein the host server is configured to send a trigger instruction to the drive processor, and the drive processor is configured to execute a data processing algorithm in response to the trigger instruction.

15. The data storage and processing system of claim 14, wherein the data processing algorithm comprises steps which when executed cause the drive processor to send the data and the processing instructions to the graphics processing unit.

16. A method of operating a data storage and processing system comprising a drive and a graphics processing unit, the drive comprising a drive processor and a drive memory, the method comprising:
receiving, by the drive processor, data from a host server;
storing, by the drive processor, the data on the drive memory;
detecting, by the drive processor, a trigger;
executing, by the drive processor, an algorithm in response to the trigger, the algorithm identifying a data chunk of the data stored on the drive memory and a transform to apply to the data chunk;
searching, by the drive processor, a capability table for an address corresponding to a device for performing the transform; and
sending, by the drive processor, the data chunk and processing instructions for processing the data chunk to the address, the address being the address of the graphics processing unit.

17. The method of claim 16, further comprising:
receiving, by the graphics processing unit, the data chunk and the processing instructions; and
processing, by the graphics processing unit, the data chunk according to the processing instructions to generate result data.

18. The method of claim 17, further comprising:
sending, by the graphics processing unit, the result data to the drive processor; and
storing, by the drive processor, the result data on the drive memory.

19. The method of claim 16, further comprising:
detecting, by a baseboard management controller, a capability of the graphics processing unit; and
updating, by the baseboard management controller, the capability table based on the capability of the graphics processing unit.

20. The method of claim 19, wherein the data storage and processing system comprises a plurality of said drive, each drive of the plurality of drives comprises a capability table, and wherein the method comprises updating, by the baseboard management controller, each capability table of each drive of the plurality of drives based on the capability of the graphics processing unit.

21. A data storage and processing system comprising a drive and a graphics processing unit, the drive comprising a drive processor and a drive memory, the system comprising:
means for receiving data from a host server;
means for storing the data on the drive memory;
means for detecting a trigger;
means for executing an algorithm in response to the trigger, the algorithm identifying a data chunk of the data stored on the drive memory and a transform to apply to the data chunk;
means for searching a capability table for an address corresponding to a device for performing the transform;

means for sending the data chunk and processing instructions for processing the data chunk to the address, the address being the address of the graphics processing unit;
means for processing the data chunk according to the processing instructions to generate result data and send the result data to the host server; and
means for detecting a plug-in event of a field replaceable graphics processing unit, determining a capability of the field replaceable graphics processing unit, and updating the capability table in response to detecting the plug-in event based on the capability of the field replaceable graphics processing unit.

* * * * *